June 4, 1963  E. A. HAYDEN  3,092,156
CHAIN SAW ATTACHMENT FOR SAWING ROUND LOGS
Filed June 3, 1960  2 Sheets-Sheet 1
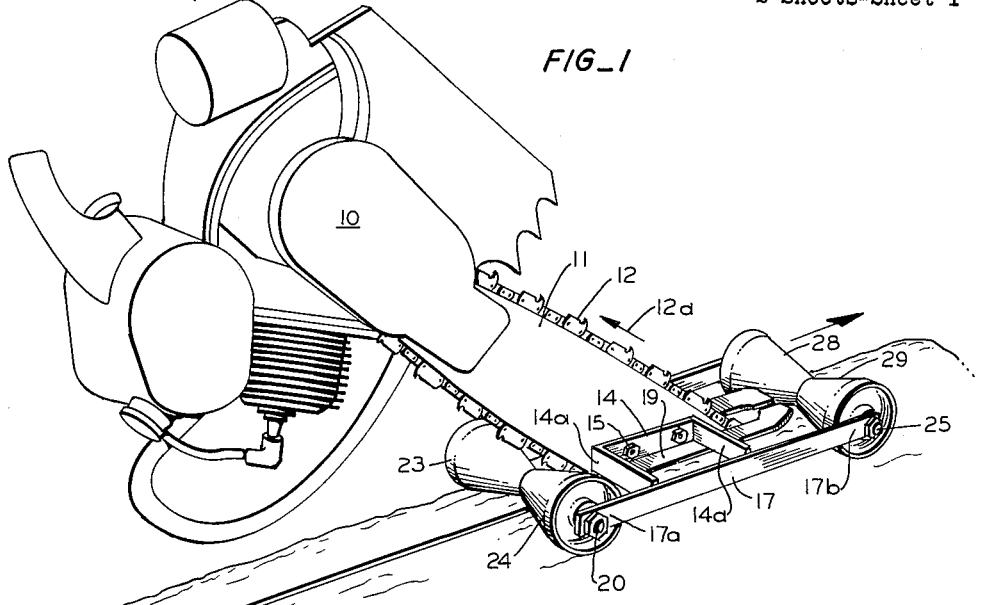
FIG_1
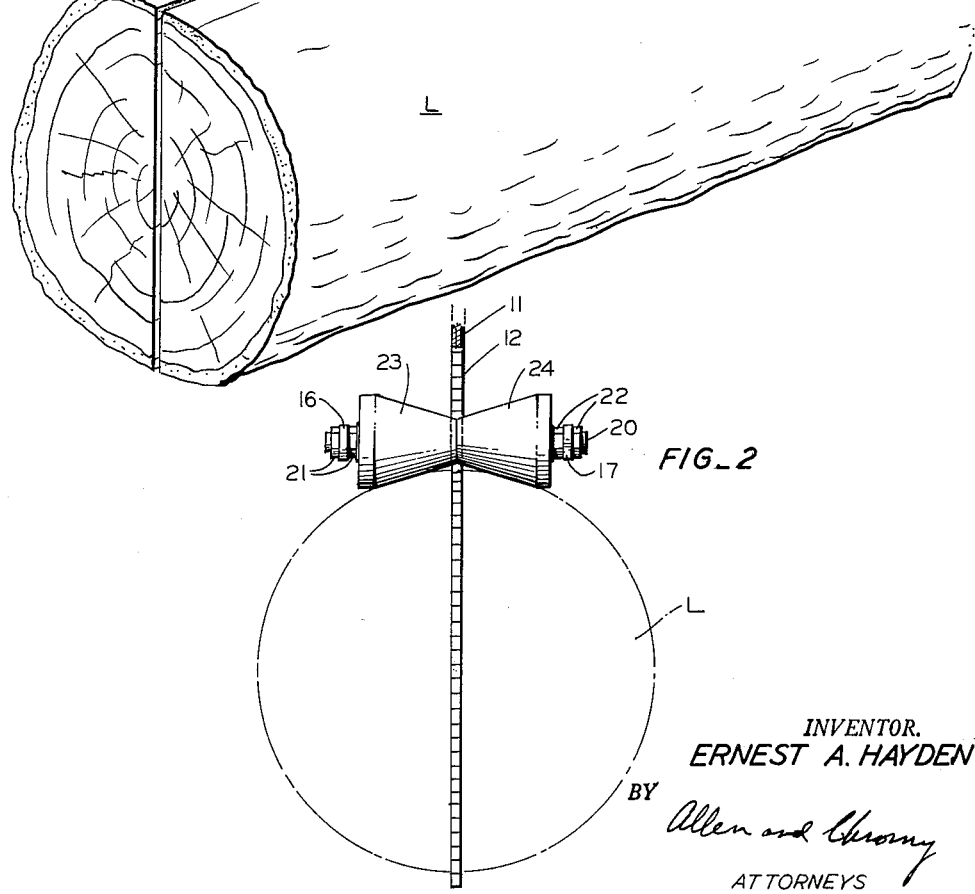
FIG_2
INVENTOR.
ERNEST A. HAYDEN
BY
*Allen and Chromy*
ATTORNEYS

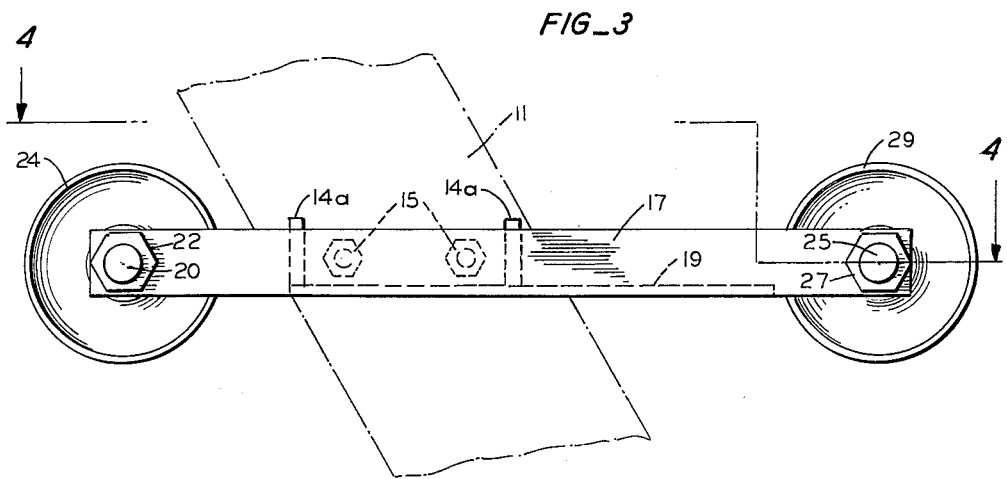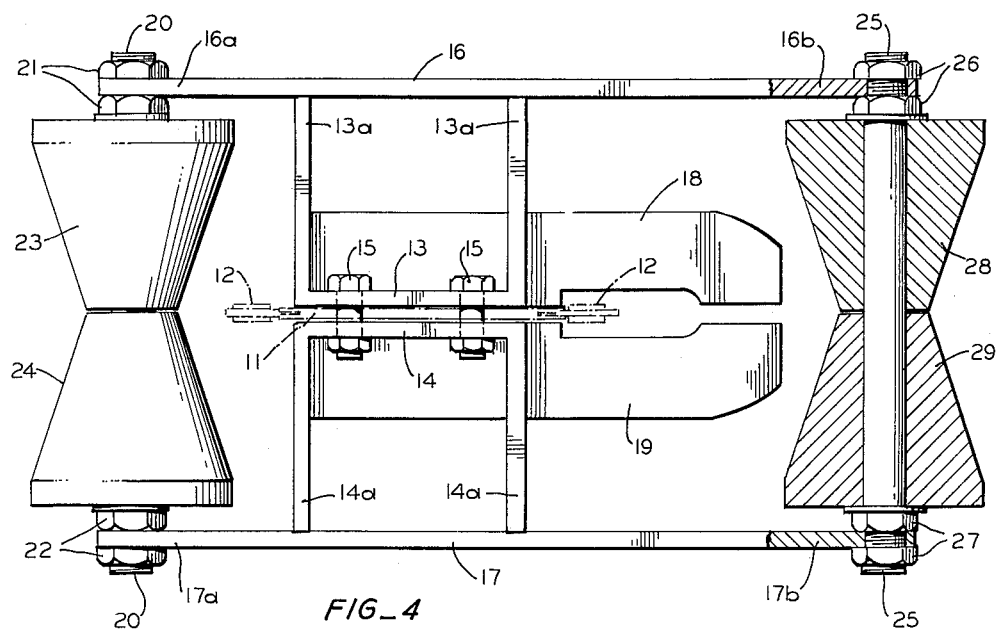

3,092,156
CHAIN SAW ATTACHMENT FOR SAWING
ROUND LOGS
Ernest A. Hayden, P.O. Box 248, Callahan, Calif.
Filed June 3, 1960, Ser. No. 33,699
6 Claims. (Cl. 143—32)

This invention relates to lumber-sawing attachments for power saws of the portable type whereby the saw may be used to cut logs in the longitudinal direction.

An object of this invention is to provide an improved portable power saw apparatus that may be used to cut logs in the direction of the length thereof.

Another object of this invention is to provide an attachment for portable power saws enabling the user of such a saw to use it for cutting logs into poles or quarters.

Still another object of this invention is to provide a carriage-like attachment that may be attached to the bar of a chain saw so that the saw may be supported on and used to cut substantially round logs to saw the logs into poles or quarter sections.

A further object of this invention is to provide a carriage-like attachment for chain saws, the attachment having forward and rearward rollers made of such configuration that they are adapted to run on down the length of the round outer surface of the log during the sawing thereof.

Other and further objects of this invention will be apparent to those skilled in the art to which it relates from the following specification, claims and drawing.

In accordance with this invention there is provided a carriage-like attachment for a portable power-driven chain-type saw so that the saw may be used for cutting substantially round logs into poles, posts or other members. This attachment is attached to the bar of the chain saw and it is provided with a forward and a rearward roller arrangement for engaging the upper substantially circular surface of a horizontal log that is being sawed. These rollers are arranged so that they ride over the top of the log in the direction of the saw cut. Thus the forward roller rides astride the portion of the log to be cut, whereas the rearward roller straddles the cut already made in the log and the saw is carried between these rollers. Also the carriage is attached to the saw bar at such an angle that the saw works its way into the log practically without any pressure from the operator.

Further details of this invention will be set forth in the specification, claims and drawing, in which briefly:

FIG. 1 is a perspective view of a chain saw provided with this attachment and shown cutting through the length of a horizontal log;

FIG. 2 is an end view of the saw-cutting element and carriage shown in FIG. 1;

FIG. 3 is a side view of the saw carriage; and

FIG. 4 is a plan view of the saw carriage showing one of the roller assemblies in cross-section.

Referring to the drawing in detail, there is shown in FIG. 1 an embodiment of this invention in which a portable power-driven chain saw 10 is provided with a carriage that is adapted to engage the upper surface of a round log L while the saw progresses down the length of the log and cuts it in half. The log is supported on suitable supports slightly above the ground so that the cutting element of the chain saw is elevated above the ground during the sawing operation. The portable power-driven chain saw 10 is of conventional construction and is provided with a saw bar 11 of elongated and flat configuration. This bar is provided with a groove around the periphery thereof for receiving the cutting element in the form of the chain saw 12, which is driven by the motor of the saw in the direction indicated by the arrow 12a.

A carriage comprising a pair of substantially U-shaped members 13 and 14 as shown in FIG. 4 is attached to the saw bar 11 by means of the bolts 15 which pass through suitable holes formed in the bar. These members 13 and 14 have end portions 13a and 14a respectively extending from the saw bar 11 in the opposite directions, and these end portions are attached by welding or the like to the bars 16 and 17 respectively. The bars 16 and 17 are substantially parallel to the saw bar 11 and each of these bars 16 and 17 have rearward end portions 16a and 17a respectively and forward end portions 16b and 17b respectively.

Plates 18 and 19 are attached by welding or the like to the U-shaped members 13 and 14 to brace these members and give additional strength to the device.

The shaft 20 is attached in holes formed in the ends 16a and 17a of the bars 16 and 17 respectively. This shaft is held in place against the end portion 16a by means of the nuts 21 threaded thereto which engage said end portion on the opposite sides thereof, and similar nuts 22 are threaded to the other end of the shaft 20 to engage the end portion 17a of the bar 17. A pair of rollers 23 and 24, each of which is of substantially frusto-conical shape, is mounted on the shaft 20 and is rotatable thereon. Another shaft 25, which is similar to the shaft 20, is mounted in suitable holes on the other ends 16b and 17b of the shaft members 16 and 17 respectively. Suitable nuts 26 are threaded to one end of the shaft 25 to engage the member 16b, and additional similar nuts 27 are provided thereto to engage the end 17b.

Frusto-conical rollers 28 and 29, similar to the rollers 23 and 24, are mounted on the shaft 25. The rollers 23, 24, 28 and 29 may have other shapes besides that shown, and the purpose of providing rollers of tapered shape as shown in FIG. 2 is so that they present a substantially concave configuration to the upper surface of the log L as shown in FIG. 2. Tapered rollers of this type provide the desired bearing surface on the log and furthermore they are adapted to ride on logs of a wide range of diameters from a relatively small diameter up to the large diameter that may be within the capacity of the saw.

In using this device when it is desired to start sawing a log, the forward rollers 28 and 29 are placed on the end of the log and the saw-cutting element is lined up with the direction of the cut. The chain saw 12 is then gradually brought into engagement with the end of the log. As the saw enters the log the machine is gradually tilted until it assumes the tilted position shown in FIG. 1. The angle at which the frame members 14 are attached to the saw bar 11 is such that the saw does not need considerable pressure applied to it to cause it to cut into the log, but because of this angle it tends to feed itself into the log. If the saw tends to feed itself into the log to fast for the power of the engine, then the saw is inclined to much and it must be brough closer to its vertical position. This may be done by increasing the diameters of the rollers 23 and 24 and reducing the diameters of the rollers 28 and 29 if desired, or it may be done by providing several pairs of holes in the saw bar 11 for receiving the bolts 15 whereby different angles may be provided for the saw.

The saw cuttings ejected by the cutting element 12 will come out just behind the rollers 28 and 29 and if these cuttings are ejected too high because of the speed of the cutting action, then a suitable flap or other type of guard or deflector may be attached to the forward ends of the plates 18 and 19 to deflect the saw cuttings and keep them from flying upward.

While I have described and illustrated a preferred embodiment of this invention in detail, it is not desired to limit this invention to the exact details illustrated and de-

What I claim is:

1. In a lumber sawing attachment for power saws of the portable type whereby the portable saw may be used to cut logs into poles, posts or the like, the combination of a portable power driven chain saw having an elongated saw bar on which the cutting element of the saw rides, a frame, means for fixedly attaching said frame to said saw bar intermediate the ends of said saw bar so that said frame extends laterally to the sides and to the front and rear of the cutting element of the power saw, means for supporting said power saw on a log of substantially circular cross-section comprising a forward roller means and a rearward rollers means, means for rotatably attaching said forward roller means to the forward part of said frame ahead of said cutting element and means for rotatably attaching said rearward roller means to the rearward part of said frame behind said cutting element, said roller means being disposed on said frame such that said forward roller means rides astride the log in the direction of the saw cut and said rearward roller means straddles the saw cut made through the log.

2. In a lumber sawing attachment for power saws of the portable type whereby the portable saw may be used to cut logs into poles, posts or the like, the combination of a portable power driven chain saw having an elongated saw bar on which the cutting element of the saw rides, a frame, means for fixedly attaching said frame to said saw bar intermediate the ends of said saw bar so that said frame extends laterally to the sides and to the front and rear of the cutting element of the power saw, means for supporting said power saw on a log of substantially circular cross section comprising a pair of forward rollers and a pair of rearward rollers, means for rotatably attaching said forward rollers to the forward part of said frame ahead of said cutting element and means for rotatively attaching said rearward rollers to the rearward part of said frame behind said cutting element, said rollers each being of substantially frusto-conical shape and the rollers of each pair being arranged with the small diameter ends thereof adjoining so that said pairs of rollers are adapted to ride on the crest of the log being cut, said rollers being disposed on said frame such that said forward rollers ride astride the log in the direction of the saw cut and said rearward rollers straddle the saw cut made through the log.

3. In a lumber sawing attachment for power saws of the portable type whereby the portable saw may be used to cut logs into poles, posts or the like, the combination of a portable power driven chain saw having an elongated saw bar on which the cutting element of the saw rides, a frame means for fixedly attaching said frame to said saw bar intermediate the ends of said saw bar so that said frame extends laterally to the sides and to the front and rear of the cutting element of the power saw, means for supporting said power saw on a log of substantially circular cross section comprising a forward roller means and a rearward roller means, a shaft attached to said frame to the front of said cutting element, said forward roller means being positioned on said shaft, a second shaft attached to said frame to the rear of said cutting element, said rearward roller means being positioned on said second shaft, said roller means being disposed on said frame such that said forward roller means rides astride the log in the direction of the saw cut and said rearward roller means straddles the saw cut made through the log.

4. In a lumber sawing attachment for power saws of the portable type whereby the portable saw may be used to cut logs into poles, posts or the like, the combination of a portable power driven chain saw having an elongated saw bar on which the cutting elements of the saw rides, a frame, means for fixedly attaching said frame to said saw bar intermediate the ends of said saw bar so that said frame extends laterally to the sides and to the front and rear of the cutting element of the power saw, means for supporting said power saw on a long of substantially circular cross section comprising a pair of forward rollers and a pair of rearward rollers, a shaft attached to said frame to the front of said cutting element, said forward rollers being positioned on said shaft, a second shaft attached to said frame to the rear of said cutting element, said rearward rollers being positioned on said second shaft, said rollers each being of substantially frust-conical shape and the rollers of each pair being arranged with the small diameter ends thereof adjoining so that said pairs of rollers are adapted to ride on the crest of the log being cut, said rollers being disposed on said frame such that said forward rollers ride astride the log in the direction of the saw cut and said rearward rollers straddle the saw cut made through the log.

5. In a lumber sawing attachment for power saws of the portable type whereby the portable saw may be used to cut logs into poles, posts or the like, the combination as set forth in claim 1 further comprising a pair of plates attached to said frame and positioned adjacent to the cutting element on opposite sides thereof to hold down the surface portions of the log immediately adjacent to the part being cut, said chain saw bar also being attached to said frame such that the chain saw is supported on the log being sewed in inverted position and tilted rearwardly so that the saw cutting element tends to feed itself into the log being sawed, said plates preventing splinters of bark and wood from being propelled toward the operator by the cutting element of the saw.

6. In a lumber sawing attachment for power saws of the portable type whereby the portable saw may be used to cut logs into poles, posts or the like, the combination as set forth in claim 1 further comprising means attached to said frame and positioned adjacent to the cutting element of said saw to hold down the surface portions of the log immediately adjacent to the part being cut so that splinters of bark and wood from adjacent to the said part are not propelled by the cutting element of the saw toward the operator.

References Cited in the file of this patent

UNITED STATES PATENTS

| 1,356,169 | Peters | Oct. 19, 1920 |
| 1,420,950 | Elder | June 27, 1922 |
| 1,647,499 | Bly | Nov. 1, 1927 |
| 1,715,949 | Rich | June 4, 1929 |
| 2,676,624 | Gecmen | Apr. 27, 1954 |

FOREIGN PATENTS

| 941,406 | France | July 19, 1948 |
| 804,863 | Germany | Apr. 30, 1951 |